United States Patent

Rydbeck et al.

[11] Patent Number: 5,890,074
[45] Date of Patent: Mar. 30, 1999

[54] MODULAR UNIT HEADSET

[75] Inventors: Nils Rutger Rydbeck, Cary, N.C.; Per Stein, Stockholm, Sweden

[73] Assignee: Telefonaktiebolaget L M Ericsson, Sweden

[21] Appl. No.: 883,809

[22] Filed: Jun. 27, 1997

Related U.S. Application Data

[63] Continuation of Ser. No. 476,504, Jun. 7, 1995, abandoned, and a continuation-in-part of Ser. No. 353,966, Dec. 12, 1994, Pat. No. 5,628,055, Ser. No. 469,655, Jun. 6, 1995, Ser. No. 471,606, Jun. 6, 1995, and Ser. No. 467,563, Jun. 6, 1995, said Ser. No. 469,655, Ser. No. 471,606, and Ser. No. 467,563, each is a continuation-in-part of Ser. No.353, 966, which is a continuation of Ser. No. 26,478, Mar. 4, 1993, abandoned.

[51] Int. Cl.[6] .............................. H04B 1/38; H04M 1/00
[52] U.S. Cl. ...................... 455/558; 455/556; 455/575; 455/90; 455/351; 455/349
[58] Field of Search ................................ 455/422, 425, 455/517, 550, 556, 557, 558, 575, 90, 99, 74, 345, 348–351, 128, 344; 379/430; 359/146, 142, 172; 364/705.01, 705.05

[56] References Cited

U.S. PATENT DOCUMENTS

| | | |
|---|---|---|
| 3,806,650 | 4/1974 | Krone et al. . |
| 4,034,164 | 7/1977 | Westmoland . |
| 4,097,691 | 6/1978 | Ehrlich et al. . |
| 4,237,540 | 12/1980 | Sato ......................................... 364/705 |
| 4,396,941 | 8/1983 | Nishimura et al. ........................ 358/93 |
| 4,591,661 | 5/1986 | Benedetto et al. . |
| 4,620,068 | 10/1986 | Wieder .................................... 379/430 |
| 4,654,662 | 3/1987 | Van Orsdel ........................ 340/870.03 |

(List continued on next page.)

FOREIGN PATENT DOCUMENTS

| | | |
|---|---|---|
| 0 426 966 | 5/1991 | European Pat. Off. . |
| 0571125A1 | 11/1993 | European Pat. Off. . |
| 4136548C1 | 9/1992 | Germany . |
| 3-151731 | 6/1991 | Japan . |
| A-2268032 | 12/1993 | United Kingdom . |
| A-2277841 | 11/1994 | United Kingdom . |
| WO90/03076 | 3/1990 | WIPO . |
| WO 94/21058 | 9/1994 | WIPO . |

OTHER PUBLICATIONS

"AT&T Paradyne Offers PCMCIA Modem For Nokia Portables", *Mobile Data Report*, Mar. 15, 1993, pp. 4–6.

*Primary Examiner*—Nguyen Vo
*Attorney, Agent, or Firm*—Jenkens & Gilchrist P.C.

[57] ABSTRACT

A modular unit having a telecommunications component, a switching circuit, and a headset link is adapted for connection with a host electronic device. The headset link of the modular unit communicates with a module link in a headset. The headset also contains earphones or a speaker, a microphone, and a control panel in electrical connection with the module link of the headset. The speaker, microphone, and control panel of the headset communicate with the headset link of the modular unit through the module link in the headset. The switching circuit of the modular unit controls whether the headset link of the module is in electrical connection with the telecommunications component of the modular unit or an electronic audio component of the host electronic device.

21 Claims, 10 Drawing Sheets

U.S. PATENT DOCUMENTS

| | | |
|---|---|---|
| 4,731,869 | 3/1988 | Farrer . |
| 4,747,122 | 5/1988 | Bhagat et al. . |
| 4,799,059 | 1/1989 | Grindahl et al. . |
| 4,847,818 | 7/1989 | Olsen . |
| 4,870,676 | 9/1989 | Lewo . |
| 4,881,258 | 11/1989 | Kaiwa et al. . |
| 4,896,370 | 1/1990 | Kasparian et al. . |
| 4,936,037 | 6/1990 | Holcomb et al. . |
| 4,939,770 | 7/1990 | Makino . |
| 4,940,976 | 7/1990 | Gastouniotis et al. . |
| 4,972,457 | 11/1990 | O'Sullivan . |
| 4,987,592 | 1/1991 | Flagg ................................. 379/430 |
| 4,993,061 | 2/1991 | Hsieh . |
| 5,018,051 | 5/1991 | Yamada et al. . |
| 5,020,090 | 5/1991 | Morris . |
| 5,028,806 | 7/1991 | Stewart et al. . |
| 5,031,046 | 7/1991 | Bruggemann ..................... 359/146 |
| 5,043,721 | 8/1991 | May ............................. 340/825.44 |
| 5,050,138 | 9/1991 | Yamada et al. . |
| 5,056,107 | 10/1991 | Johnson et al. . |
| 5,056,153 | 10/1991 | Taniguchi ............................. 455/89 |
| 5,109,540 | 4/1992 | Dzung et al. . |
| 5,113,428 | 5/1992 | Fitzgerald . |
| 5,125,021 | 6/1992 | Lebowitz . |
| 5,153,829 | 10/1992 | Furuya et al. . |
| 5,157,247 | 10/1992 | Takahira . |
| 5,161,803 | 11/1992 | Ohara . |
| 5,183,404 | 2/1993 | Aldous et al. . |
| 5,185,700 | 2/1993 | Bezos et al. . |
| 5,189,632 | 2/1993 | Paajanen et al. . |
| 5,194,860 | 3/1993 | Jones et al. . |
| 5,197,092 | 3/1993 | Bamburak . |
| 5,201,066 | 4/1993 | Kim . |
| 5,202,838 | 4/1993 | Inoue . |
| 5,202,913 | 4/1993 | Lang et al. . |
| 5,203,021 | 4/1993 | Repplinger et al. . |
| 5,233,646 | 8/1993 | Kuromi . |
| 5,243,640 | 9/1993 | Hadley et al. . |
| 5,251,232 | 10/1993 | Nonami . |
| 5,260,989 | 11/1993 | Jenness et al. ........................ 379/59 |
| 5,335,273 | 8/1994 | Takagi et al. . |
| 5,335,276 | 8/1994 | Thompson et al. . |
| 5,361,061 | 11/1994 | Mays et al. . |
| 5,373,149 | 12/1994 | Rasmussen ......................... 235/492 |
| 5,373,300 | 12/1994 | Jenness et al. . |
| 5,418,836 | 5/1995 | Yazaki ................................. 379/58 |
| 5,438,329 | 8/1995 | Gastouniotis et al. ......... 340/870.02 |
| 5,537,673 | 7/1996 | Nagashima ......................... 455/346 |
| 5,579,489 | 11/1996 | Dornier ............................... 395/281 |

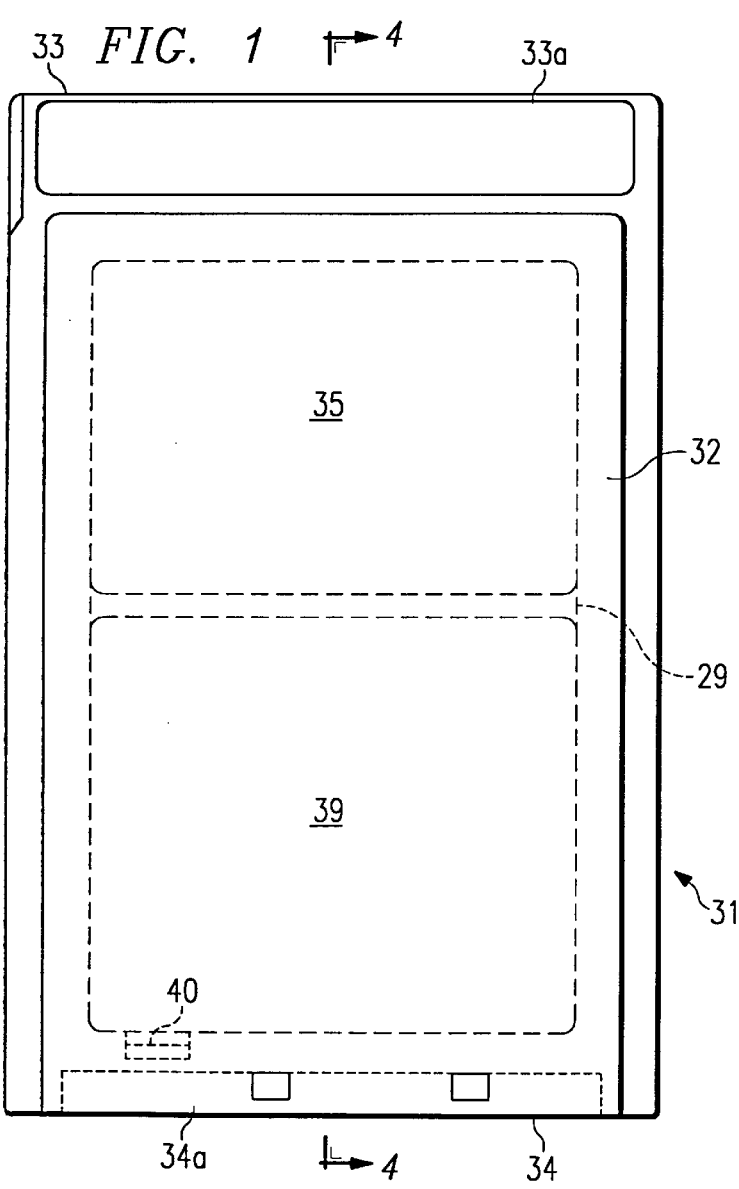
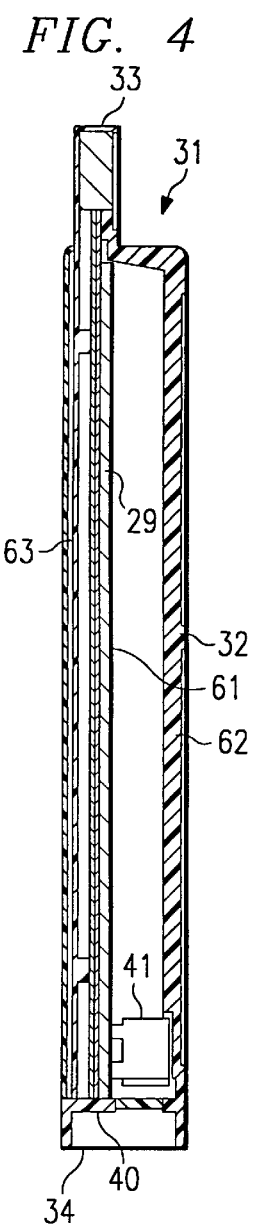
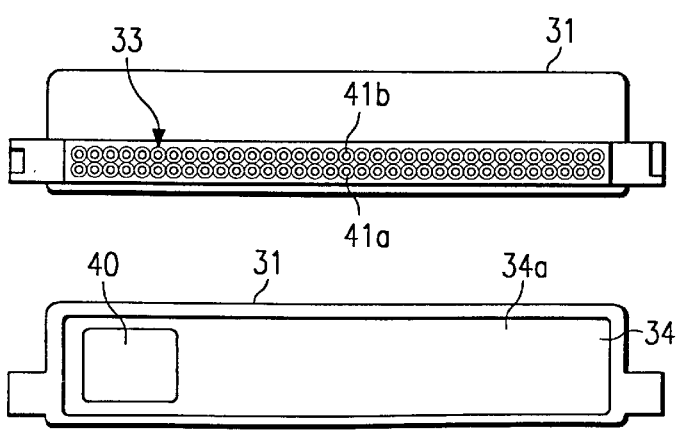
FIG. 1
FIG. 4
FIG. 2
FIG. 3

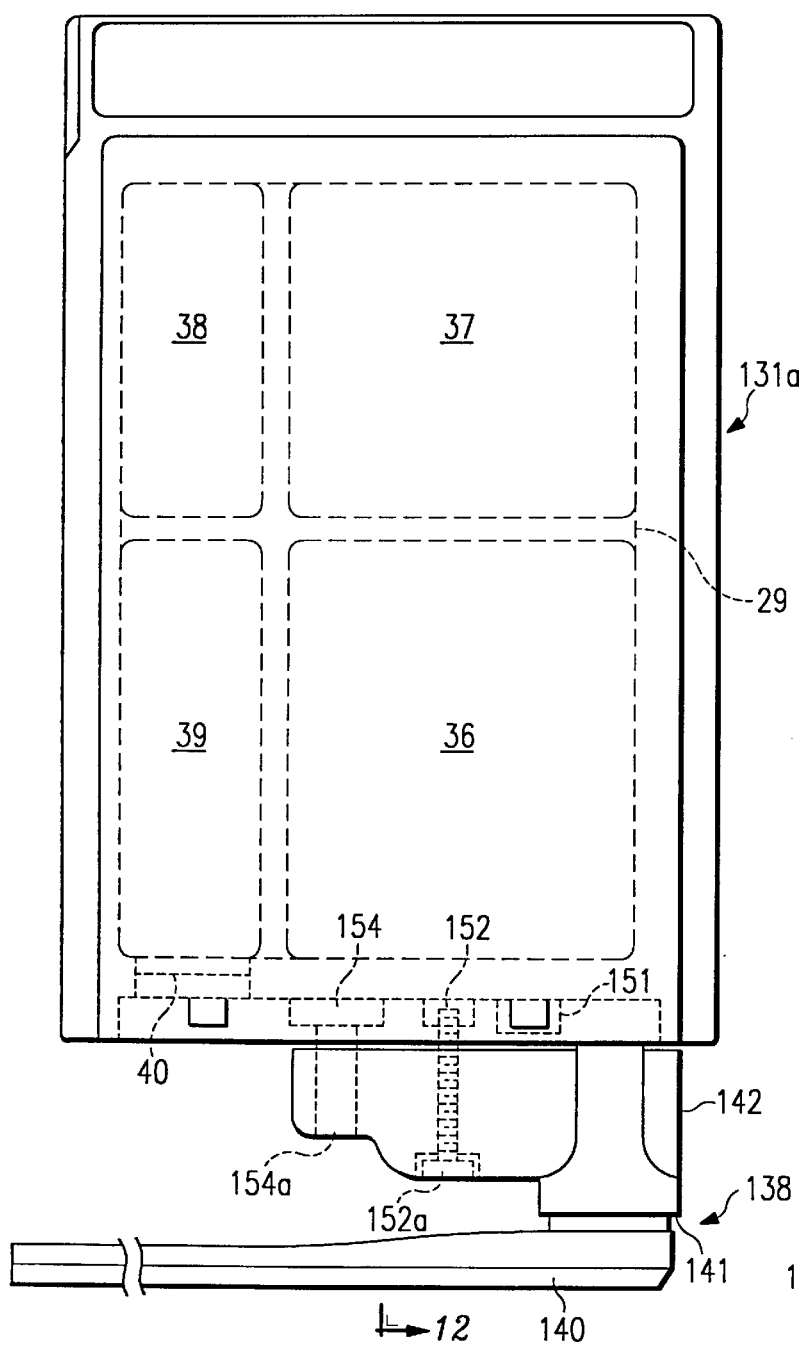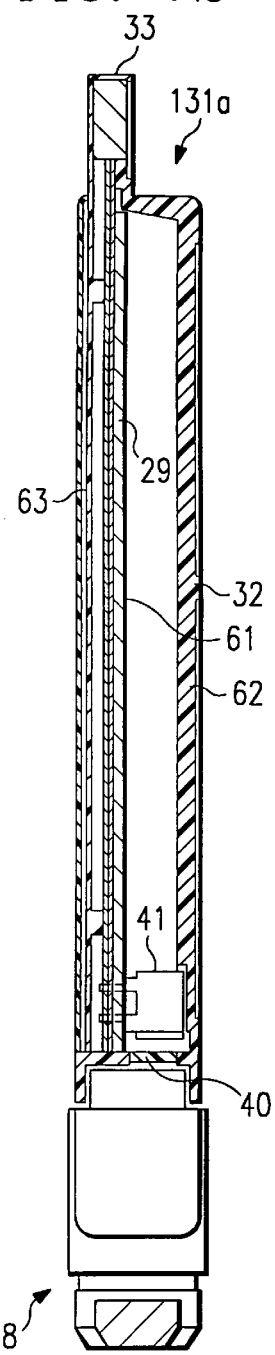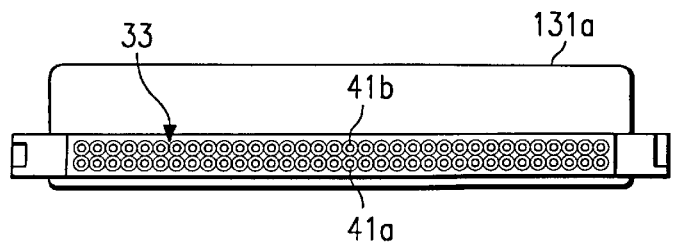

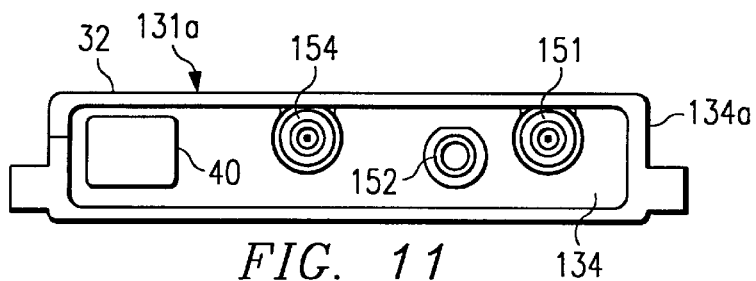
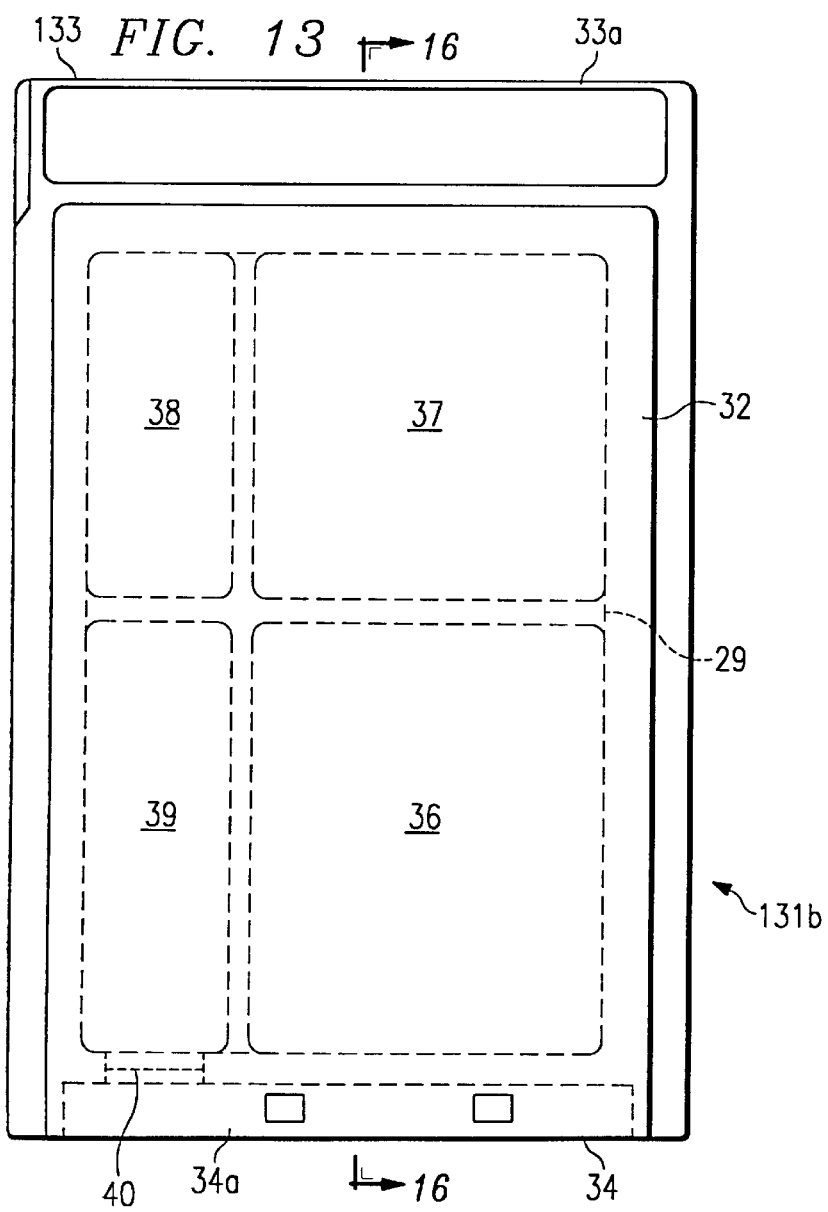
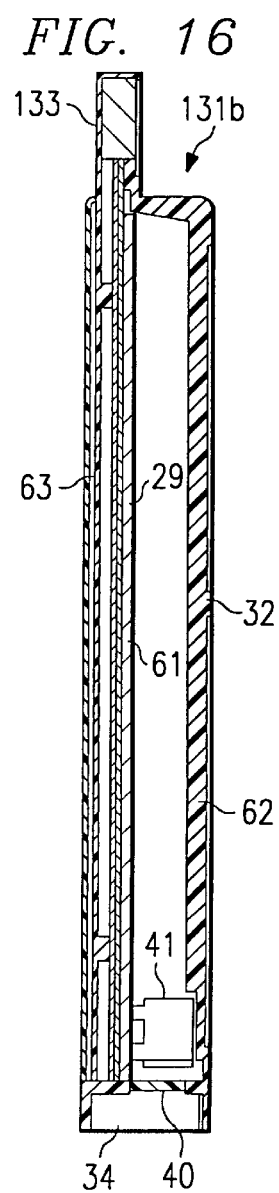

MODULAR UNIT HEADSET

CROSS-REFERENCE TO RELATED APPLICATIONS

This application is a continuation of U.S. patent application Ser. No. 08/476,504, filed Jun. 7, 1995, now abandoned. This application is also a continuation-in-part of U.S. patent application Ser. No. 08/353,966 entitled "MODULAR RADIO COMMUNICATIONS SYSTEM" filed on Dec. 12, 1994 by co-inventor Per Stein, now U.S. Pat. No. 5,628,055; which is a continuation of U.S. patent application Ser. No. 08/026,478 entitled "MODULAR RADIO COMMUNICATIONS SYSTEM" filed Mar. 04, 1993 (now abandoned) by co-inventor Per Stein; and which are both hereby incorporated herein in their entirety by this reference thereto. This application is also a continuation-in-part of copending U.S. patent application Ser. No. 08/469,655, entitled "ELECTRONIC METERING EQUIPMENT SYSTEM", copending U.S. patent application Ser. No. 08/471,606, entitled "ELECTRONIC EQUIPMENT AUDIO SYSTEM", and copending U.S. patent application Ser. No. 08/467,563, entitled "ELECTRONIC EQUIPMENT DATA SYSTEM", all having been filed on Jun. 6, 1995 by co-inventor Per Stein, which are all a continuation-in-part of co-pending U.S. patent application Ser. No. 08/353,966 entitled "MODULAR RADIO COMMUNICATIONS SYSTEM" filed on Dec. 12, 1994 by co-inventor Per Stein, now U.S. Pat. No. 5,628,055 (cited above); which are all assigned to the assignee of the present invention; and which are all hereby incorporated herein in their entirety by this reference thereto.

BACKGROUND OF THE INVENTION

1. Field of the Invention

The present invention relates to electronic equipment and, more particularly, to a modular unit for use in establishing a link between electronic equipment and a headset.

2. Description of Related Art

The fields of consumer electronics, data processing, and telecommunications have experienced marked technological advances in recent years. Personal stereo cassettes, disc players, and automobile AM/FM radios have become smaller and more efficient, as has related consumer electronic hardware. The great advances in memory chips and miniaturization techniques have also enabled more and more electronic systems to be packaged in smaller and smaller spaces. The same is true for industrial electronic equipment and for personal computers.

Like consumer electronic equipment in general, personal computers are manufactured by many different suppliers around the world. An entire industry has subsequently developed in supplying memory cards for enhancing the capacity of this wide variety of personal computers. Recently, there has been a movement toward standardizing the interconnection formats for use in circuit cards for personal computers. In particular, the PC and Memory Card International Association (PCMCIA) was formed with the goal of promoting the interchangeability of integrated circuit and memory cards among computer and other types of electronic products. Toward this end, the PCMCIA has promulgated certain physical and electrical standards to ensure that cards will be able to be used in different pieces of equipment. Both data storage, i.e. memory, and peripheral expansion, i.e. I/O, card types constructed in accordance with these standards should be able to be used in any receiving device also constructed in accordance with the standards. Such a standard is set forth in a variety of documents including the PCMCIA PC Card Standard, Release 2.0, incorporated by reference herein. The standard sets forth a 68 pin interchange for I/O type circuit cards for use in PC's.

Advances in wireless telecommunications have also moved rapidly in recent years. Various communication standards have been promulgated around the world defining specific frequencies, data rates, data formats, and the like for both voice and data communications by radio links between base stations and mobile units. For example, specialized packet switching systems for mobile data communications have enabled portable computers to directly uplink data access into the landline data communication network. Similarly, conventional voice based cellular radio systems, both analog and digital versions, can receive data from portable computers and transmit that data through the conventional telephone network to a remotely located data terminal. In addition, other systems such as paging (both local and global), DECT (Digital European Cordless Telecommunications), Mobitex, CDPD (Cellular Digital Packet Data), PCS (Personal Communications System) and the like have come into recent use. Each of these wireless telecommunications formats and standards generally requires separate software to provide a gateway for data into the wireless network as well as separate transmission/reception formats. This allows communication with radio base stations operating in different geographic areas as well as parts of different networks. It has been determined to be desirable, however, to package radio transceivers and/or modems in a modular manner so that a telecommunications terminal, such as a portable telephone or a portable personal computer, could be adapted for communication with different systems by simply replacing the modular unit with one which was especially configured for the telecommunications network with which communication was desired. The advantages of such radio transceiver packages should not, however, be limited to portable telephones and portable computers when other consumer and industrial electronic equipment can also be used with such packages.

The use of card mounted telecommunications interface equipment in a PC has existed for some time. In particular, modems are frequently mounted on an I/O card and plugged into receiving receptacles within the PC. The modem then enables the interface of a PC with standard telecommunication network lines and the transmission/reception of data for those lines. This is an extremely useful tool and maximizes the usefulness of the PC. Industrial and consumer and electronic equipment, such as radio or tape players, have not yet been included in this technological integration with telecommunication to the extent of the PC. It would be an advantage therefor to provide a modular mounted radio transceiver, such as a standard PCMCIA card, which is readily replaceable in conventional consumer and industrial audio electronic equipment such as tape player and stereos to communicate with various networks in accordance with various radio standards.

Many conventional consumer and industrial audio electronic equipment have no headset with earphones, or have headsets connected by a cable. Headsets connected by cables to the audio electronic equipment limit the motion of a user. Therefore, it would be an advantage to provide a system which provides a headset for audio electronic equipment without a headset, and provides a connection between the audio electronic equipment and the headset which does not limit the movement of a user to the extent movement is limited by a cable.

SUMMARY OF THE INVENTION

In one aspect, the present invention includes a host electronic system, a modular unit electronically connected to the host electronic system, a headset, and means for communicating between the modular unit and the headset. In a further embodiment, the means for communicating between the modular unit and the headset includes a first short-range radio transceiver located in the modular unit, and a second short-range radio transceiver located in the headset and for communicating with the first short-range radio transceiver. In another further embodiment, the means for communicating between the modular unit and the headset includes a first infra-red transceiver located in the modular unit, and a second infra-red transceiver located in the headset for communicating with the first infra-red transceiver. In yet another further embodiment, the modular unit is of a PCMCIA standard.

In another aspect, the present invention includes a host electronic system connected to a telephone network, a modular unit electrically connected to the host electronic system and having a telecommunications component for establishing a telecommunications link with the telephone network, a headset, and means for communicating between the telecommunications component of the modular unit and the headset. In a further embodiment, the host electronic system is connected to the telephone network through a Local Area Network. In another further embodiment, the host electronic system includes an electronic audio component, and the modular unit includes a switch for electrically switching the means for communicating between an electrical connection with the telecommunications component of the module and an electrical connection with the electronic audio component of the host electronic system. In yet even a further embodiment, the switch comprises means for fading out audio signals from the electronic component of the host electronic system, and transmitting a signal indicating that an incoming call is available, upon sensing an incoming call to the telecommunications component of the modular unit.

In another aspect, the present invention includes a host electronic system having a module port with a module connector, and an electronic audio component electrically connected to the module connector; a module unit having a housing with a first end, a system connector disposed on the first end of the housing for engagement with the module connector of the host electronic system, a telecommunications transceiver for communicating input signals and output signals with one of a plurality of standardized wireless networks in accordance with at least one preselected communication standard, and a switch having a first input electrically connected to the telecommunications transceiver, a second input electrically connected to the electronic audio component of the host electronic system through the module connector and the system connector, and an output, wherein the output is selectively connectible to the first input or the second input; a headset having a speaker and a microphone; and means for communicating between the output of the switch in the modular unit and the speaker and the microphone of the headset. In a further embodiment, the module port and the modular unit are of a PCMCIA standard. In another further embodiment, the headset includes a keypad which provides control signals to the telecommunications transceiver of the modular unit through the means for communicating. In yet another further embodiment, the means for communicating includes a cable extending between the modular unit and the headset. In yet another further embodiment, the means for communicating includes a first infra-red transceiver in the modular unit and a second infra-red transceiver in the headset, wherein the first infra-red transceiver communicates with the second infra-red transceiver. In yet another further embodiment, the means for communicating includes a first short-range radio transceiver in the modular unit and a second short-range radio transceiver in the headset, wherein the first short-range radio transceiver communicates with the second short-range radio transceiver. In yet another further embodiment, the host electronic system includes a battery supply, and the telecommunications transceiver of the modular unit receives electrical power from the battery power supply through the module connector of the host electronic system and the system connector of the modular unit. In yet even a further embodiment, the module connector of the module port and the system connector of the modular unit are of a modified PCMCIA standard which includes power contacts for transmitting the electrical power from the battery power supply to the telecommunications transceiver. In another further embodiment, the system includes an external power source for providing electrical power to the telecommunications transceiver of the modular unit through a power connector mounted on the housing of the modular unit. In yet another further embodiment, the host electronic system includes an antenna connected to the telecommunications transceiver of the module through the module connector of the host electronic system and the system connector of the modular unit, and the telecommunication transceiver communicates with the standardized network through the antenna. In yet even a further embodiment, the module connector of the module port and the system connector of the modular unit are of a modified PCMCIA standard which includes at least one contact for coupling the antenna with the telecommunications transceiver. In yet another further embodiment, the system includes an antenna for being coupled to the telecommunications transceiver of the modular unit through an antenna connector mounted on the housing of the modular unit. In another further embodiment, the switch includes means for fading out the audio signals from the electronic audio component to the speaker and emitting a signal indicating that an incoming call is available, upon sensing an incoming call to the telecommunication transceiver. In yet a further embodiment, the host electronic system includes a display for displaying the functional information of the host electronic system, wherein the telecommunications transceiver of the modular unit provides data signals to the display through the system connector of the modular unit and the modular connector of the host electronic system, and wherein the display displays functional information of the telecommunications transceiver. In another further embodiment, the host electronic system includes a keypad for providing control signals to the host electronic system, and wherein the keypad provides control signals to the telecommunications transceiver of the modular unit through the module connector of the host electronic system and the system connector of the modular unit.

BRIEF DESCRIPTION OF THE DRAWINGS

For a more complete understanding of the present invention and for further objects and advantages thereof, reference may now be had to the following description taken in conjunction with accompanying drawings, in which:

FIG. 1 is a top plan view of a modular unit constructed in accordance with the principles of the present invention and having a standard PCMCIA card interconnectivity format;

FIG. 2 is a front elevational view of the modular unit of FIG. 1, illustrating a standard PCMCIA card interconnectivity format;

FIG. 3 is a rear elevational view of the modular unit of FIG. 1, illustrating a window in the rear of the modular unit;

FIG. 4 is a side cross-sectional view of the modular unit of FIG. 1 taken along section lines 4—4 thereof;

FIG. 9 is a top plan view of another modular unit constructed in accordance with the principles of the present invention and having a standard PCMCIA card interconnectivity format;

FIG. 10 is a front elevational view of the modular unit of FIG. 9 illustrating a standard PCMCIA card interconnectivity format;

FIG. 11 is a rear elevational view of the modular unit of FIG. 9 illustrating an external antenna mounted thereon;

FIG. 12 is a side elevational, cross-sectional view of the modular unit of FIG. 9 taken along the lines 12—12, illustrating the attachment of the antenna thereto;

FIG. 13 is a top plan view of yet another embodiment of a modular unit constructed in accordance with the principles of the present invention and having a modified PCMCIA card interconnectivity format;

FIG. 16 is a side elevational, cross-sectional view of the modular unit of FIG. 13 taken along the lines 16—16 thereof;

DETAILED DESCRIPTION OF EMBODIMENTS

Figure 5:
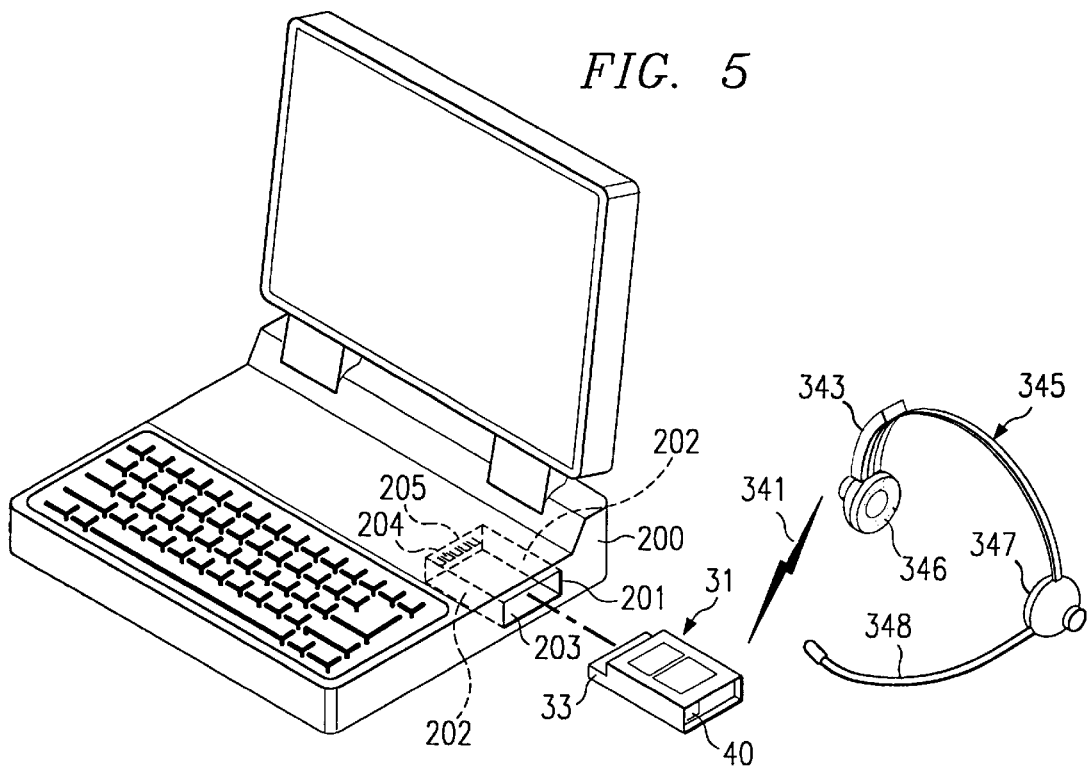
FIG. 5 is an exploded, perspective view of a modular unit of the type shown in FIG. 1 and its mounting in a computer.

Referring now to FIG. 1, there is shown a top plan view of the modular unit 31, constructed in accordance with the principles of the present invention. The modular unit 31 is constructed to conform with a standard PCMCIA card interconnectivity format embodied in connector 33. The modular unit 31 has been designed to have telecommunications capabilities and to communicate with a headset, as will be discussed below. The modular unit 31 includes an outer shell 32 which is generally flat and has located at a first end 33a a multiple pin connector 33 (seen most clearly in FIG. 2) having a plurality of individual contacts for engagement with a mating connector located within an item of electronic equipment. The opposite end 34a of the modular unit 31 includes a recessed region 34 where external connectors may be mounted, similar to the external connectors illustrated in FIGS. 9, 11, and 12.

Still referring to FIG. 1, the modular unit 31 contains a telecommunications circuitry 35 and headset link circuitry 39 mounted on a card 29. The telecommunications circuitry 35 and the headset link circuitry 39 are shown in the modular unit 31 by dotted lines, which also define the card 29. The headset link 39 can be a short range radio transmitter/receiver, an infra-red transmitter/receiver, or the like. A window 40 in the modular unit 31 permits radio or infra-red signals to be emitted and received by the headset link 39 within the modular unit 31. Power, controls, and the telecommunications interface are coupled to the card 29 through select contacts in the multipin connector 33.

Figure 14:
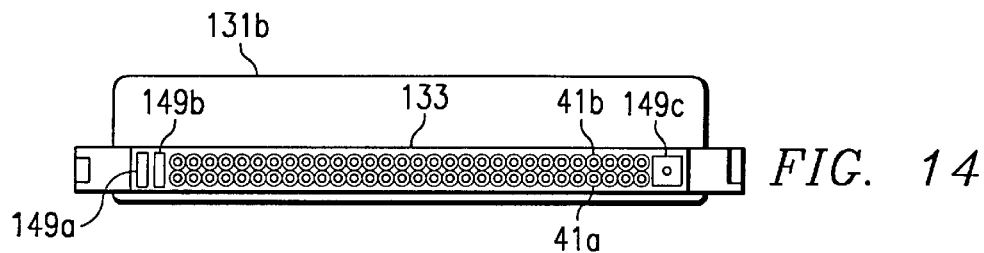
FIG. 14 is a front elevational view of the modular unit shown in FIG. 13 illustrating the pin connections thereto.

Referring now to FIG. 2, there is shown a front elevational view of the modular unit 31 of FIG. 1, illustrating more clearly the multipin connector 33. The multipin connector 33 is constructed in accordance with the current standard PCMCIA card interconnectivity format. The connector 33 comprises a pair of rows of contacts 41a and 41b. The contacts 41a and 41b of the multipin connector 33 are connected to the circuitry within the card 29 in FIG. 1. A person of ordinary skill in the art will understand that the present invention includes embodiments with the connector modified to accommodate power pins, antenna connectors, or the like, as illustrated in FIG. 14.

Referring now to FIG. 3, there is shown a rear elevational view of the modular unit 31 from FIG. 1. The end 34a of the module 31 is formed with a recess 34, wherein a window 40 permits the headset link 39 (shown in FIG. 1) to transmit and receive a linking signal. Other connectors may be mounted in the recess 34 of the end 34a for use in coupling the card 29 (shown in FIG. 1) to other external connections for items such as an antenna or a power supply.

Referring now to FIG. 4, there is shown a side elevational, cross sectional view of the module 31. As most clearly shown in this view, the card 29 of the module 31 includes a printed circuit board 61 on which various printed circuit card traces are formed and various components, for example ASICs (Application Specific Integrated Circuits), may be mounted to comprise the telecommunications circuitry 35 and the headset link circuitry 39. The circuitry on the board 61 is selectively connected to the contacts 41a–41b on the connector 33 to couple signals into and out of the circuitry within the modular unit 31. An upper shell 62 covers the upper portion of the components mounted on the board 61, while a lower shell 63 covers the lower surface of the board 61 and mates with the upper shell 62 to form the enclosed outer shell 32 of the modular unit 31. In this particular view, the window 40 in the recess 34 is shown with a transmitter/receiver 41 of the headset link 39 directly behind the window 40, so that the transmitter/receiver 41 can send and receive signals through the window 40.

Referring now to FIG. 5, there is shown an installation of the modular unit 31 into a computer 200 which has been modified in design to include a mounting slot 201. The mounting slot 201 is particularly adapted for receipt of and connection to module 31. The mounting slot 201 is constructed with side walls 202 and a frontal opening 203. A mating connector 204 is disposed along end 205 for mating connection with connector 33.

Still referring to FIG. 5, the computer 200 is connected to a telecommunications line by either a direct connection, over a Local Area Network (LAN), or the like. The computer connects the telecommunications line with the telecommunications circuitry 35 (shown in FIG. 1) of the modular unit 31 through the mating connector 204 of the computer 200, and the module connector 33 of the modular unit 31. Other components of the computer 200, such as the power supply, keyboard, display, or the like, can also be connected to the modular unit 31 through the mating connector 204 and the module connector 33.

Referring still to FIG. 5, the headset 345 includes earphones 346 and 347, and a microphone 348 extending from the earphone 347. The earphones 346 and 347, and the microphone 348, are coupled to the headset link 39 in the module 31 through the transmitter/receiver 343 of the headset 345. In one embodiment, the headset 345 also includes a keypad or control panel (not shown) which is coupled to the transmitter/receiver 343. The headset link 39 (shown in FIG. 1) of the module 31 transmits and receives a linking signal 341 through the window 40 to establish communication with the transmitter/reciever 343 of the headset 345. The earphones 346 and 347, the microphone 348, and the keypad (not shown) of the headset 345 communicate with the telecommunications circuitry 35 of the module 31 through the transmitter/receiver 343 of the headset 345, and through the headset link 39 of the module 31.

Figure 6:
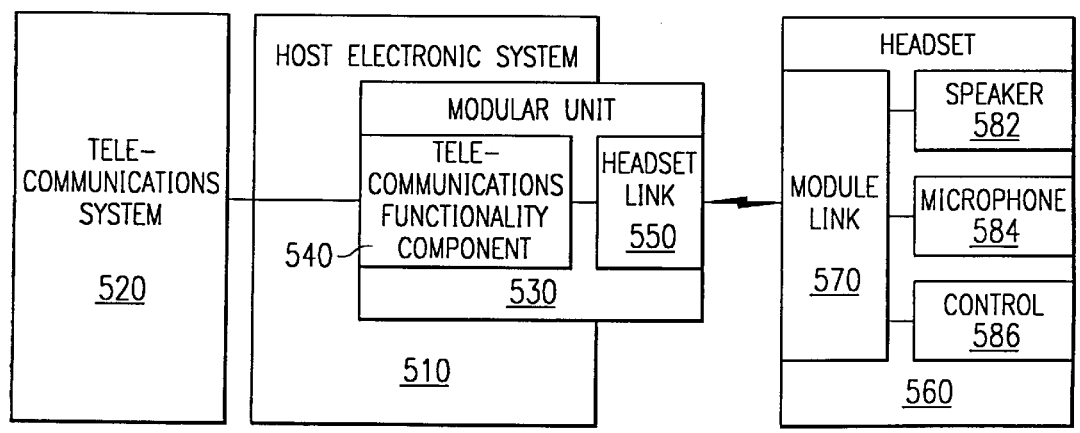
FIG. 6 is a block diagram illustrating one embodiment of the present invention having a telecommunications component and a headset link.

Referring now to FIG. 6, there is shown a block diagram of the embodiment of the present invention shown in FIG. 5. Although the host electronic system depicted in FIG. 5 is described as the computer 200, it is to be understood that the present invention is not to be limited to computers, and that a person of ordinary skill in the art will understand that the principles of the present invention can be applied to many types of electronic systems. A host electronic system 510 is connected to a telecommunications system 520 by a direct connection, over a LAN, or the like. A modular unit 530 is connected to the host electronic device 510. The modular unit 530 contains a telecommunications functionality component 540 which communicates with the telecommunication system 520 through the host electronic device 510. A headset link 550 in the modular unit 530 communicates with the telecommunications functionality component 540.

Still referring to FIG. 6, a headset 560 has a module link 570 which communicates with the headset link 550 of the modular unit 530. The headset 560 also includes earphones or a speaker 582, a microphone 584, and a keypad or control 586, which are all connected to the module link 570 of the headset 560. It can be seen that the speaker 582, the microphone 584, and the keypad 586 communicate with the telecommunications component 540, in the modular unit 530 through the module link 570 in the headset 560, and through the headset link 550 in the modular unit 530. In this manner, the headset 560 can utilize the telecommunications functionality component 540 to place and receive calls over the telecommunications system 520.

Referring still to FIG. 6, in one embodiment, the telecommunications component 540 is located within the host electronic system 510 instead of the modular unit 31. In another embodiment, the telecommunications component 540 resides in another modular unit (not shown) which is connected to the host electronic system, and is connected to the headset link 550 of the modular unit 530 through the host electronic system 510. In yet another embodiment, the telecommunications component 540 resides in another modular unit (not shown) which connects directly to the modular unit 530. In yet another embodiment, the telecommunications component 540 is located remotely from the host electronic system 510, with the telecommunications component 540 being connected to the host electronic system 510 by a direct connection, over a LAN, or the like, and with the headset link 550 of the modular unit 530 connecting to the telecommunications component 540 via the host electronic system 510.

Figure 7:
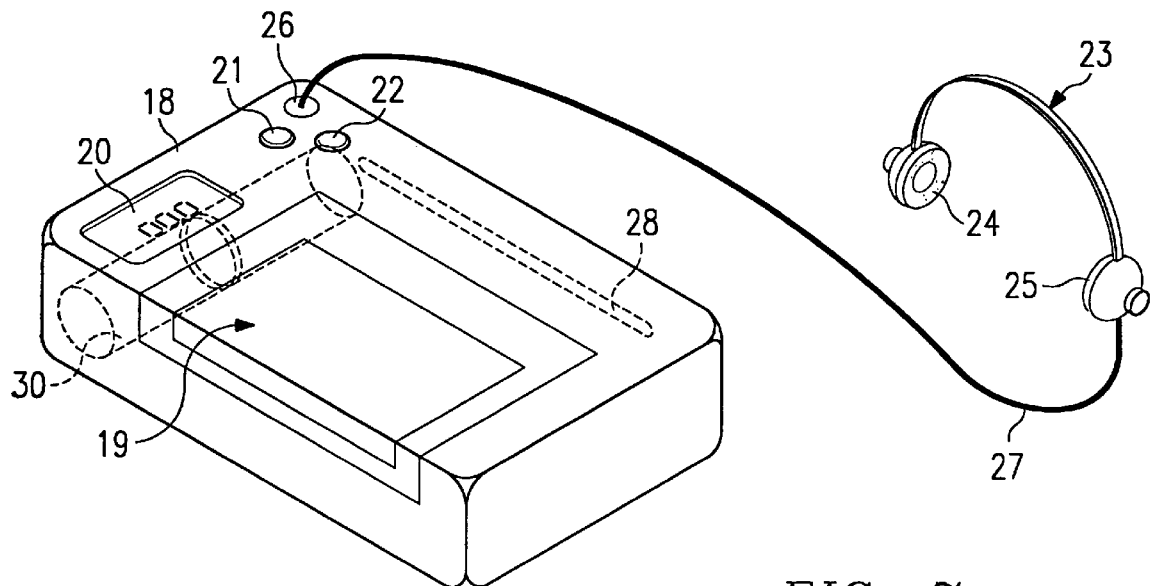
FIG. 7 is a diagram illustrating a prior art electronic system in the form of a personal radio/tape player.

Referring next to FIG. 7, there is shown an example of a conventional electronic system in the form of a conventional personal radio/tape player 18, which may be modified to utilize the principles of the present invention. Although the conventional electronic system depicted herein for modification according to the present invention is described as being a personal radio/tape player, it is to be understood that the reference to an electronic system is not meant to be limited to a personal radio/tape player, and that a person of ordinary skill will understand that the principles of the present invention can be applied to S many different types of electronic systems. The personal radio/tape player 18 shown herein includes a conventional tape receiving compartment 19, a display panel 20, and control knobs 21 and 22. The personal radio/tape player 18 also has an antenna 28 and a battery power source 30 disposed internally. The personal radio/tape player 18 sends an audio signal to the speakers 24 and 25 of a headset 23 through a connection 26 and a cable 27.

Figure 8:
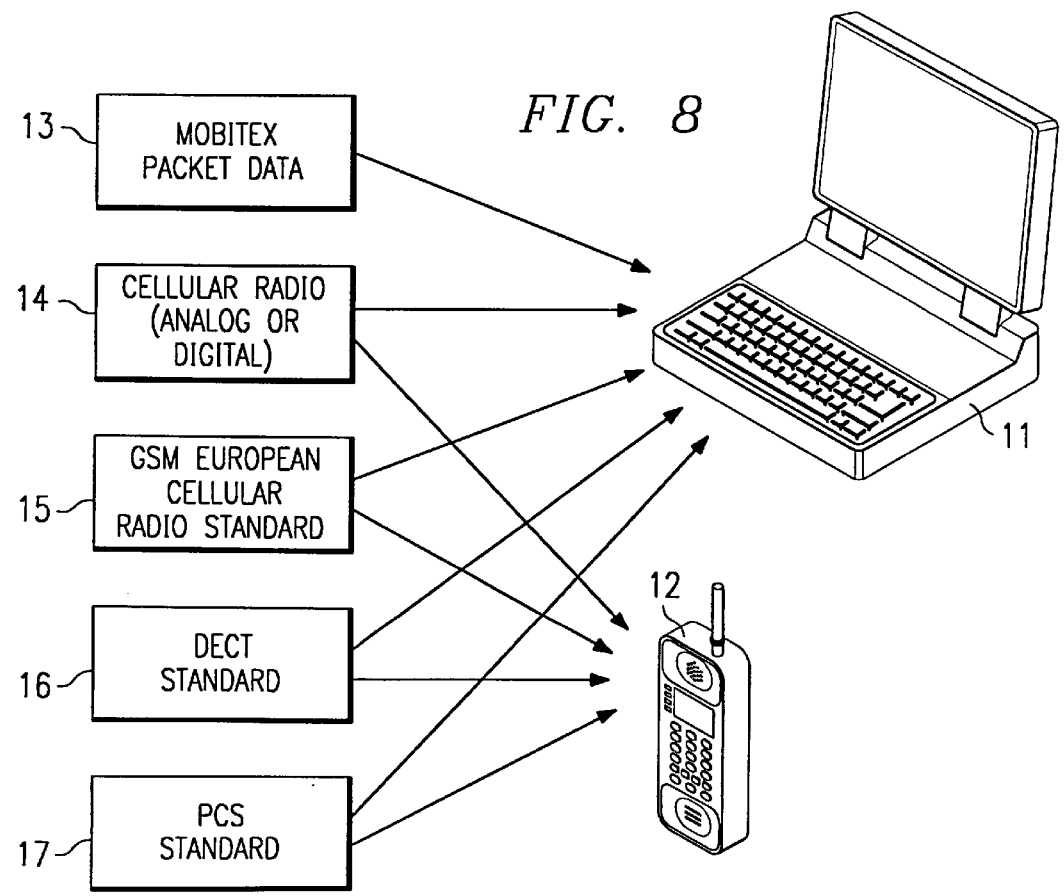
FIG. 8 is a block diagram illustrating an overall concept of telecommunications with electronic equipment.

Referring next to FIG. 8, there are shown portable communications devices in the form of a data processing unit, such as a laptop or notebook computer 11 and a portable telephone instrument 12. It is well established to allow the PC 11 and telephone 12 to communicate with various wireless telecommunication networks as most fully described in co-pending U.S. patent application Ser. No. 08/353,966 described above. Each of the telecommunication networks may, however, include different telecommunication standards and/or require modems of different types as represented diagrammatically in blocks 13–17. The various telecommunication standards may include, for example, AMPS, D-AMPS, JDC, TACS, GSM, NMT-450, NMT-900, DECT, Mobitex and future Spread Spectrum standards, as well as many more.

Still referring to FIG. 8, the portable telephone subscriber instrument 12 may include basic components for telecommunications with various wireless networks operating in accordance with numerous telecommunications standards. For example, should the telephone instrument 12 be needed for use in the United States, it must be capable of transmitting/receiving on a defined frequency band and in accordance with either the analog or digital modulation techniques in use in the United States. However, should the telephone instrument 12 be needed for communication with the wireless system which exists in the U.K. or Continental Europe, it would have to be capable of communicating on different frequencies and in accordance with somewhat different modulation techniques in order to be useful.

Referring still to FIG. 8, the laptop computer 11 may be needed for data communication with a number of different data networks which exist in a number of parts of the world. For example, a package switched data network exists in the Scandinavian and several European countries, and in the United States and Canada, which functions utilizing data packets of a prescribed size. The package switched data network is constructed in accordance with a prescribed protocol and provided as part of a service referred to by the trademark "MOBITEX" with which the assignee of the present invention is associated. Similarly, the laptop computer 11 may also be needed for communication with the United States cellular radio network (either in analog or digital format), with the European GSM digital cellular radio network, or the CDPD (Cellular Digital Package Data) network from time to time. Thus, the broad concept of the system of the present invention includes providing radio transceivers and/or modems 13–17 which are adapted for use in communication with the various networks in accordance with various standards used therein. Additionally, the term "transceiver" as used herein comprises appropriate radio control logic of the type necessary to make up a radio device that is capable of communicating with a wireless communication standard such as D-amps, GSM, etc. For example, the transceiver may include a transmitter, receiver, and when the communications device is used for data transmission, the transceiver may also incorporate data modem circuitry. As described in more detail below, a laptop computer 11 incorporates means for generating user communication signals in the form of its keyboard. Other items of electronic equipment particularly adapted for consumer use do not necessarily include signal generation means.

Still referring to FIG. 8, the modem 13 provides for radio communication with the MOBITEX packet data switched network, while modem 14 represents a modular unit which could be constructed to communicate with the conventional cellular radio network in the United States, either in analog or digital format. Similarly, the modem 15 might be adapted for radio communication with the European digital cellular radio network in accordance with the GSM standards adopted by the European Telecommunications Standards Institute (ETSI). Modem 16 could, likewise, permit telecommunications in accordance with the Digital European Cordless Telecommunications (DECT) standard. Other modems 17 can be used which permit communication on a paging network such as a local or a global paging system, communication on a PCS (Personal Communication System), or communication on any other like systems. The PCS may become the next generation of cellular systems combining wide area networks and on-site networks for both data and voice communication. Any of modems 14–17 might be useful within either the laptop computer 11 or the telephone subscriber instrument 12 while those units, as well as the MOBITEX data packet modem 13, could be used within the laptop computer 11. Moreover, the use of standard modems packaged in a modular form in standard sizes, would have great advantages in the future in providing flexibility within both voice and data telecommunication systems used throughout the world.

Referring now to the grouping of FIGS. 9–12 and 13–16, there are shown two versions of a modular unit constructed in accordance with the principles of the present invention. FIGS. 9–12 (group one) illustrate a modular unit 131a which is constructed to conform with a standard PCMCIA card interconnectivity format embodied in connector 33. FIGS. 13–16 (group two) illustrate a modular unit 131b which is constructed with a modified connector 133 which does not comply with existing PCMCIA standards due to modifications in antenna and power connections discussed below. The modules 131a and 131b are constructed in accordance with, and have the attributes of, the teachings in copending U.S. patent application Ser. No. 08/353,966, filed Dec. 13, 1994, entitled "Modular Radio Communications System" by co-inventor Per Stein, and assigned to the assignee of the present invention, which is hereby specifically incorporated by reference. The modules 131a and 131b have also been designed to communicate with a headset and the host electronic equipment, as will be discussed below. Each version of the above-referenced modular units will now be discussed below.

Referring now to FIGS. 9–12, the group one version of the modular unit outlined above, and in particular to FIG. 9 there is shown a top plan view of the modular unit 131a. A radio transceiver 36, a modem 37, a switching circuit 38, and a headset link 39 are shown in the modular unit 131a by dotted lines, which also define the telecommunications card 29. The headset link 39 can be a short range radio transmitter receiver, an infra-red transmitter/receiver, or the like. A window 40 in the modular unit 131a permits radio or infra-red signals to be transmitted and received by the headset link 39 in the modular unit 131a.

Still referring to FIG. 9, the modular unit 131a also has a mounting member 152 and connectors 151 and 154 which are also represented by dotted lines. The connector 151 comprises a coaxial antenna coupling which is plugged into the antenna 138. The particular modular antenna structure of FIG. 9 includes an antenna bar 140, which is pivotally mounted through pivot antenna mount 141 to rotate about a base structure 142. Base 142 is coupled to the module 131a with a conventional fastener, such as a threaded member 152a shown in dotted lines engaging mounting member 152. Antenna connector 151 is also shown by dotted lines to illustrate a conventional coaxial connection thereto from antenna 140. The antenna 140 may then be rotated into the most appropriate position for maximizing effectiveness of use. Rotatable antennas are, of course, conventional in this technological area. The use, however, of such a modular antenna on a modular unit 131a, adapted for the applications described herein, is a marked advance over the prior art. Power connector 154 is also shown by dotted lines in registry with access aperture 154a, which will be discussed below.

Referring now to FIG. 10 there is shown a front elevational view of the modular unit 131a of FIG. 9, illustrating more clearly the multipin connector 33. The multipin connector 33 is constructed in accordance with the current standard PCMCIA card interconnectivity format. The connector 33 comprises a pair of rows of contacts 41a and 41b. No separate power or antenna connectors are shown herein due to the fact that this particular contact configuration conforms with the existing PCMCIA standard and the antenna and power connectors are presented in the rear portion 134a of module 131a as described herein. The contacts 41a and 41b of the multipin connector 33 are connected to the circuitry within the card 29 (shown in FIG. 9).

Referring now to FIG. 11 there is shown a rear elevational view of the modular unit 131a constructed in accordance with the principles of the present invention. In this embodiment, the modular unit 131a includes a rear portion 134a having a recess 134 wherein coaxial connector 151 is secured adjacent a mounting member 152 such as a threaded coupling. The coaxial connector 151 is mounted for use in coupling the radio transceiver 36 within the module 131a to an antenna disposed either internally or externally of the particular electronic equipment in which the unit 131a is connected. When an antenna is mounted directly to the module 131a, mounting member 152 provides a means for securement of the antenna structure to module 131a, as will be described in more detail below. A connector 154 and a window 40 are also disposed in the recess 134 of the modular unit 131a. The connector 154 enables coupling of external power to the telecommunications card 29 within the module 131a. The window 40 permits the headset link 39 to transmit and receive a linking signal from inside the enclosed outer shell 32 of modular unit 131a.

Referring now to FIG. 12 there is shown a side elevational, cross-sectional view of the modular unit 131a of FIG. 9 taken along the section lines 12—12 thereof. As shown in FIG. 12, the module 131a includes a card 29 comprising a printed circuit board 61 onto the surface of which various printed circuit card traces may be formed and various components may be mounted to comprise the radio transceiver 36, the modem 37, the switching circuit 38 and the headset link 39 within the module 131a (shown in FIG. 9). The circuitry on board 61, is selectively connected to the terminals of connector 33 to couple signals into and out of the circuitry within the module 131a. An upper shell 62 covers the upper portion of the components mounted on the printed circuit board 61, while a lower shell 63 covers the lower surface of the board and mates with upper shell 62 to form an enclosed outer shell 32 of the unit 131a. In this particular view the window 40 is shown with a transmitter/receiver 41 of the headset link 39 directly behind the window 40, so that the transmitter/receiver 41 can send and receive signals through the window 40. The construction of modular antenna 138 is as described above in connection with FIG. 9.

Referring now to FIGS. 13–16, the group two version of the modular unit outlined above, there is shown in FIG. 13 a top plan view of a modular unit 131b constructed to conform with modified PCMCIA card interconnectivity format. In particular, the modular unit 131b includes an outer shell 32 which is generally flat and has located at a first end 33a a multipin connector 133 (seen most clearly in FIG. 14) having a plurality of individual contacts for engagement with a mating connector located within an item of electronic equipment. The opposite end 34a of the modular unit 131b includes a recessed region 34 where external power and antenna connectors may be mounted, as described above with regard to FIGS. 9, 11, and 12.

Still referring to FIG. 13, as shown by dotted lines extending there across, the module 131b houses a card 29 including a radio transceiver 36, a modem 37, a switching circuit 38, and a headset link 39. The card 29 is shown by dotted lines as are transceiver section 36, the modem section 37, the switching circuit section 38, and the headset link section 39. Power, controls, antenna, speakers, and microphone are coupled into the card 29 through selected contacts from the multipin connector 133, describe in more detail below.

Referring now to FIG. 14, there is shown a front elevational view of the modular unit 131b of FIG. 13, illustrating more clearly the multipin connector 133. The contacts of multipin connector 133 are connected to circuitry within the card 29 (shown in FIG. 13). The connector 133 comprises a pair of rows of contacts 41a and 41b constructed in accordance with the standard PCMCIA format. In the system of the present invention, certain areas of the contact array have been modified and the contacts provided in a different configuration and/or format to allow connection to an antenna and/or power source for transmission of increased amounts of power into the circuitry of the card 29. Such connection may be necessary when the power requirements of the modular unit 131b cannot be adequately handled by the normal signal carrying contacts 41a–41b. Contacts 149a and 149b are thus shown to illustrate such a modified power pin configuration. Connector 149c illustrates an antenna coupling. It should be noted that other antenna and power connections may be provided in accordance with the principles of the present invention.

Figure 15:
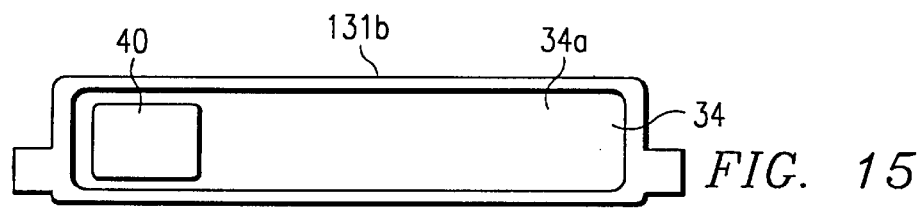
FIG. 15 is a rear elevational view of the modular unit of FIG. 13 illustrating one embodiment thereof with no antenna or power connector thereon.

Referring now to FIG. 15, the modular unit 131b has an end 34a which is formed with a recess 34, wherein a window 40 permits the headset link 39 (shown in FIG. 13) to transmit and receive a linking signal. Other connectors may be mounted in the recess 34 of the end 34a for use in coupling the card 29 within the module 131b to other external connections for items such as an antenna or a power supply. However, with the antenna connector 149c and power contacts 149a and 149b provided along connector 133, such external connectors are not necessary along the opposite end in recess 34. For this reason, no connectors are shown in this particular embodiment.

Referring now to FIG. 16, there is shown a side elevational, cross sectional view of the module 131b. As most clearly shown in this view, the card 29 of module 131b includes a printed circuit board 61 on the surface, on which various printed circuit card traces may be formed and various components, for example ASICs, may be mounted to comprise the radio transceiver 36, the modem 37, the switching circuit 38, and the headset link 39 within the module 131b. The circuitry on the board 61 is selectively connected to the contacts in the connector 133 to couple signals into and out of the circuitry within said module 131b. An upper shell 62 covers the upper portion of the components mounted on the board 61, while a lower shell 63 covers the lower surface of the board and mates with the upper shell 62 to form an enclosed outer shell 32 of the modular unit 131b. In this particular view, the window 40 is shown in the recess 34 with a transmitter/receiver 41 of the headset link 39 directly behind the window 40, so that the transmitter/receiver 41 can send and receive signals through the window 40.

Referring now to FIG. 9–16 in combination, although the modular unit 131a and the modular unit 131b have been illustrated as having the radio transceiver 36, the modem 37, the switching circuit 38, and the headset link 39, in one construction of the present invention the modular unit 131a and the modular unit 131b do not include the radio transceiver 36, the modem 37, or the switching circuit 38. In another construction, the modular unit 131a and the modular unit 131b do not include the modem 37.

Figure 17:
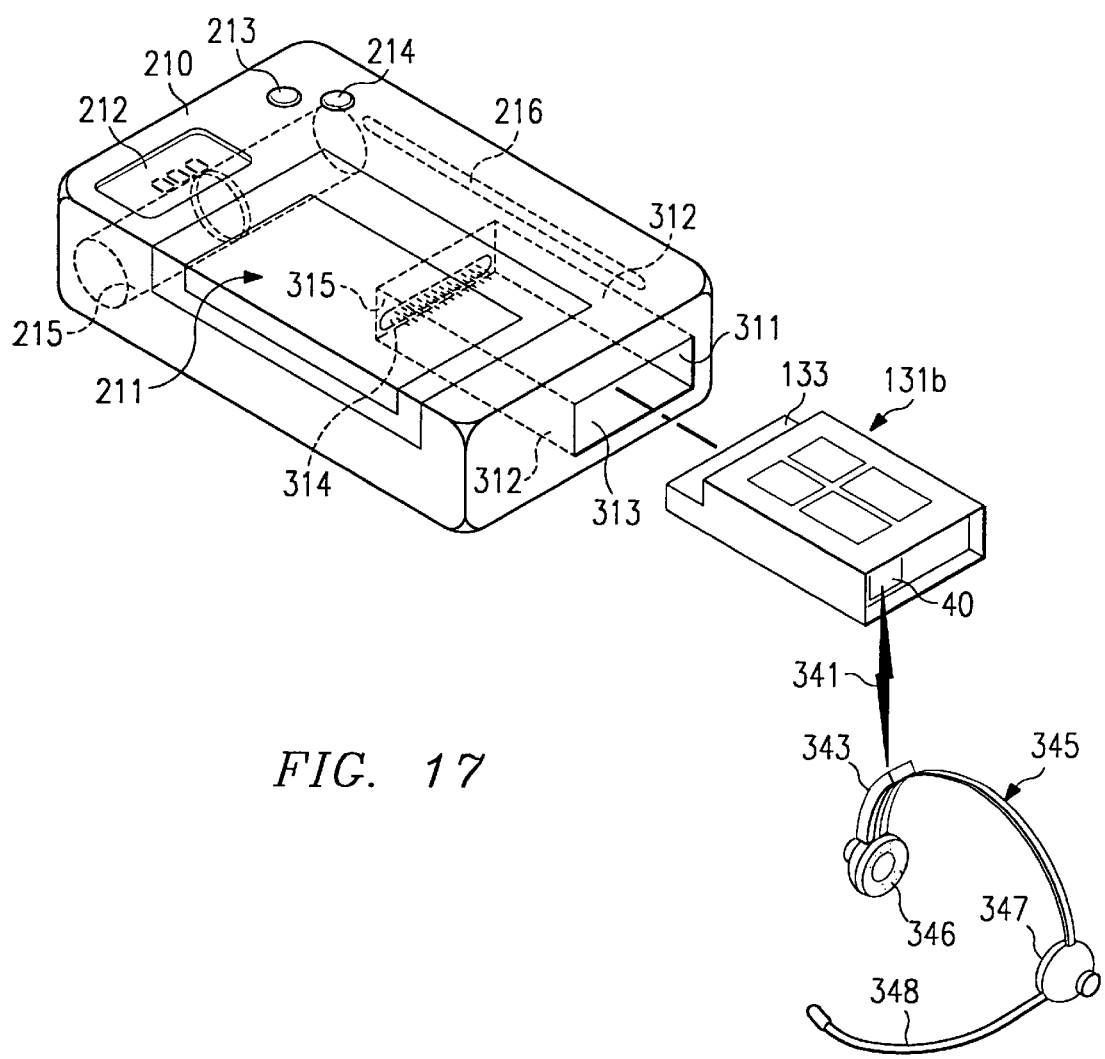
FIG. 17 is an exploded, perspective view of a modular unit of the type shown in FIG. 13 in association with a module receiving slot in an electronic system in the form of a personal radio/tape player.

Referring now to FIG. 17 there is shown a conventional electronic system, in the form of a conventional personal radio/tape player which has been modified as an embodiment of the present invention, illustrated as a personal radio/tape player 210. The tape player 210 shown herein includes a conventional tape receiving compartment 211, a display panel 212, and operation control knobs 213 and 214. The personal radio/tape player 210 also includes a conventional battery power source 215 and a conventional antenna 216.

Still referring to FIG. 17, the personal radio/tape player 210 includes a mounting slot 311 for the installation of the modular unit 131b. The mounting slot 311 is particularly adapted for receipt of and connection to module 131b. The slot 311 is constructed with side walls 312 and a frontal opening 313. A mating connector 314 is disposed along end 315 for mating connection with connector 133 of the module 131b. The audio signal of the personal radio/tape player 210 is connected to the module 131b through the connector 314 and the connector 133 of the module 131b. The battery power supply 215, antenna 216, and the display 212 in the personal radio/tape player 210 are also connected to the module 131b through the connector 314 and the connector 133.

Still referring to FIG. 17, the module 131b transmits and receives a linking signal 341 through the window 40 to establish communication with the transmitter/receiver 343 of the headset 345. The earphones 346 and 347, and the microphone 348, are coupled to the transmitter/receiver 343 of the headset 345. In one embodiment, the headset 345 also includes a keypad or control panel (not shown) which is coupled to the transmitter/receiver 343 of the headset 345. The earphones 346 and 347, the microphone 348, and the keypad (not shown) of the headset 345 communicate with the switching component 38 of the module 131b through the transmitter/receiver 343 of the headset 345 and through the headset link 39 of the module 131b.

Figure 18:
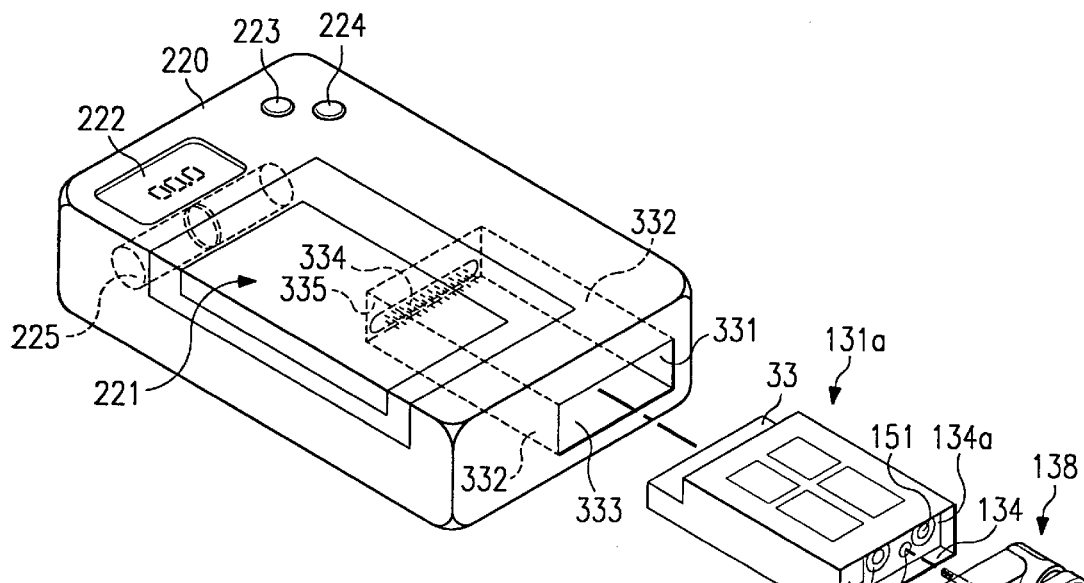
FIG. 18 is an exploded, perspective view of a modular unit of the type shown in FIG. 9 in association with a module receiving slot in an electronic system in the form of a personal radio/tape player.

Referring now to FIG. 18, there is shown a personal radio/tape player 220 according to another embodiment of the present invention. Similar to the personal radio/tape player 210 in FIG. 15, the personal radio/tape player 220 has a conventional tape receiving compartment 221, a display panel 222, and operation control knobs 223 and 224. The personal radio/tape player 220 also includes a conventional battery power source 225 disposed internally.

Still referring to FIG. 18, the personal radio/tape player 220 includes a mounting slot 331 for the installation of the modular unit 131a. The mounting slot 331 is particularly adapted for receipt of and connection to module 131a. The slot 331 is constructed with side walls 332 and a frontal opening 333. A mating connector 334 is disposed along end 335 for mating connection with connector 33. The audio signal of the personal radio/tape player 220 is connected to the switching component 38 of the module 131a through the connector 334 and the connector 33. The battery power supply 225 and the display 222 in the personal radio/tape player 220 are also connected to the module 131a through the connector 334 and the connector 33. The modular antenna structure 138 (described above) is also shown in position for mounting to the end 134a of unit 131a. The fastener 152a engages the mounting member 152 and secures the antenna 138 to the module 131a. Connecting end 134a thus includes recess 134 which houses connectors 151 and 154. Connector 151 is preferably a coaxial connector adapted for coupling to antenna 138, while connector 154 is constructed for connecting external power (if necessary) to the modular unit 131a through aperture 154a found in antenna base structure 142. In that regard, an AC/DC power supply (not shown) can provide external power to the module 131a from an external source.

Still referring to FIG. 18, the module 131a transmits and receives a linking signal 341 through the window 40 to establish communication with the transmitter/receiver 343 of the headset 345. The earphones 346 and 347, the microphone 348, and the keypad (not shown) of the headset 345 communicate with the headset link 39 of the module 131a through the transmitter/receiver 343 of the headset.

Figure 19:
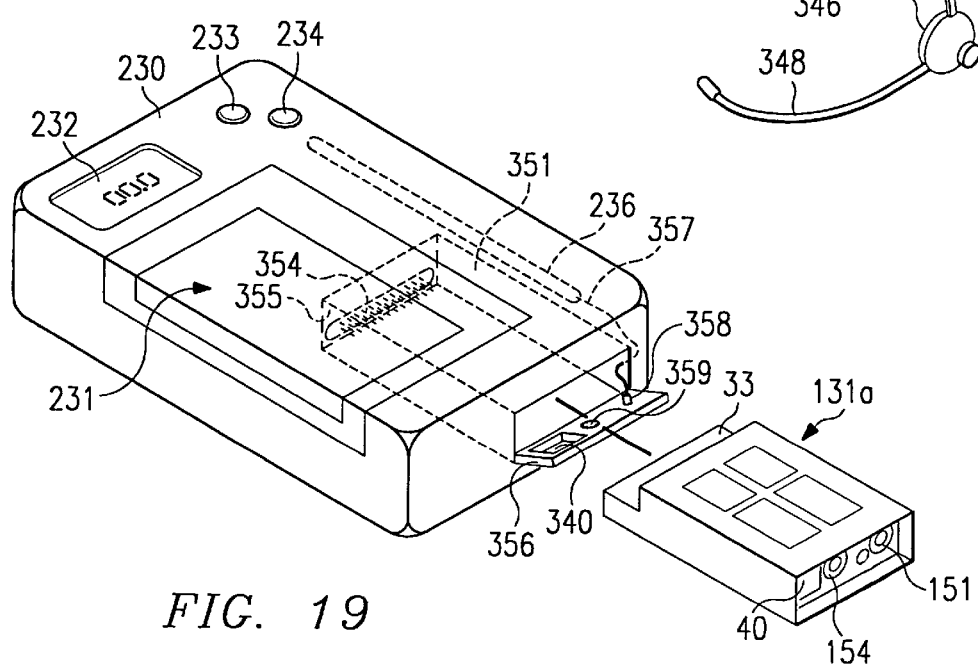
FIG. 19 is an exploded, perspective view of a modular unit of the type shown in FIG. 9 in association with a module receiving slot in an electronic system in the form of a personal radio/tape player.

Referring now to FIG. 19 there is shown an alternative mounting of the modular unit 131a of FIG. 9 and an alternative personal radio/tape player 230. As described above, connector 33 of module 131a is shown to matingly connect with slot connector 354 disposed on end 355 of slot 351. In this particular view, the modular unit 131a is being installed in a tape player 230 constructed with a flap 356. The flap 356 is provided in a configuration for closure over the unit 131a and direct coupling with coaxial connector 151, while continuing to expose the window 40, and while continuing to expose external power connector 154. Aperture 340 is positioned in flap 356 for alignment with the window 40 of the module 131a, and is sized to allow the headset link 39 of the module 131a to communicate with the headset 345 (not shown). In this embodiment, an internal/external antenna 236 is specifically shown within the tape player 230, as is conventional for tape player/radio combinations. Consumer AM/FM radios require an antenna which may be solely internal or partially retractable into the tape player 230 when the AM/FM radio is not being used. The antenna 236 (shown in phantom) is connected by a cable 357 (partly shown in phantom) to flap connector pin 358 of flap 356. Aperture 359 is positioned in flap 356 for alignment with power connector 154 of module 131a and sized to facilitate receipt of, and connection into connector 154, of a plug from and external power source (not shown). In an alternative embodiment, not specifically shown, an internal power supply from the tape player 230 may be connected to the connector 154 of module 131a by coupling to a power connection pin disposed on the flap 356 in place of the aperture 359.

Referring still to FIG. 19, the headset 345 of FIGS. 17 and 18 is not shown in this particular view for purposes of clarity. The tape player 230 does, however, include a tape installation slot 231, a display screen 232, operation control knobs 233 and 234, as well as the antenna 236. Electronic systems, such as the personal radio/tape player 230, are constructed in a variety of configurations. Although only a single equipment configuration is shown herein (showing particular amenities such as display screen 232), this is not meant to limit in any way the type of electronic system that may be utilized in accordance with the principles of the present invention.

Figure 20:
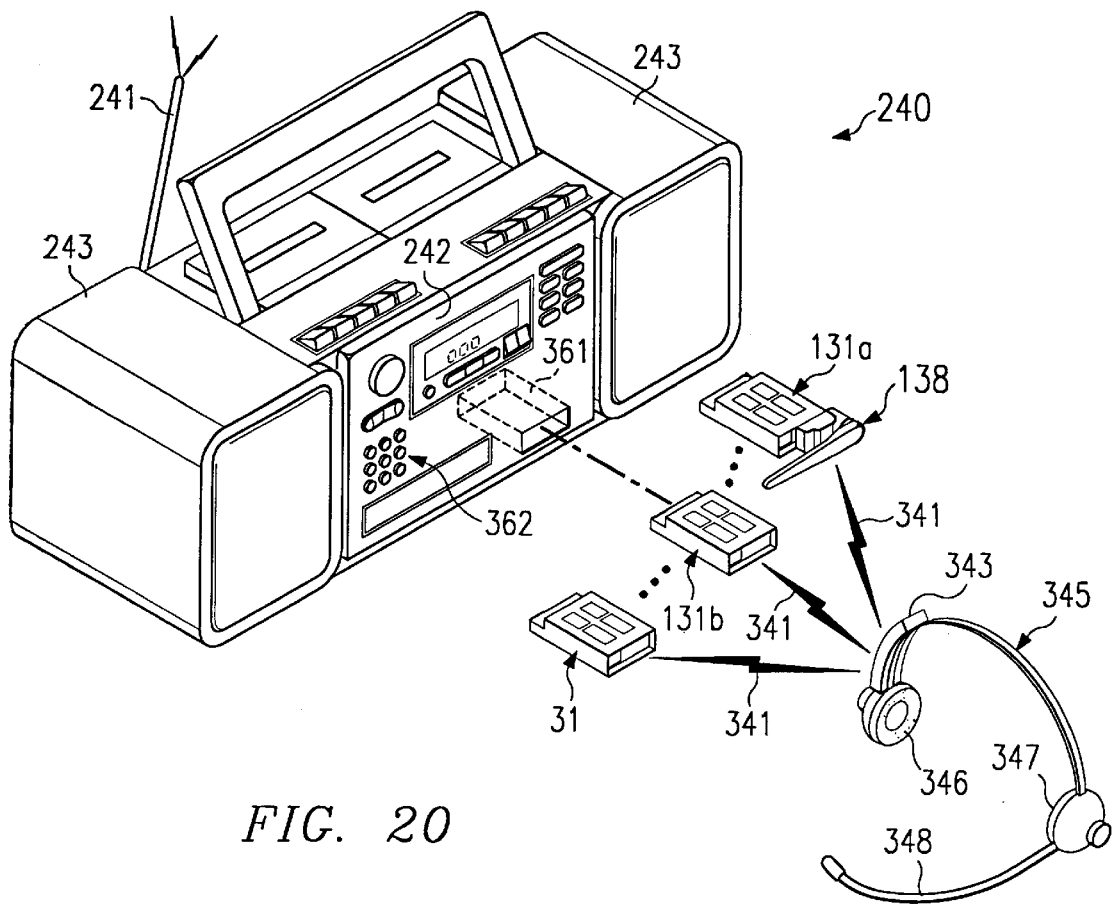
FIG. 20 is an exploded, perspective view of a modular unit of the type shown in FIG. 1, FIG. 9, or FIG. 13, in association with a module receiving slot in an electronic system in the form of a Portable Tape Player-AM/FM Radio.

Referring now to FIG. 20 there is shown an illustration of another item of electronic systems in the form of a portable tape player-AM/FM Radio which is of the conventional type of portable radio that has been modified for utilizing the module 31, the module 131a, or the module 131b. Also shown are the versatility and multiple uses possible with the modular units 31, 131a, and 131b of the present invention. As stated above, any one of the module 31, 131a, or 131b may be used in such applications. As previously stated, the modular units 31, 131a, and 131b provide a headset link and telecommunication technology capability to the host equipment. However, several technologies may, in fact, reside on a single card within the modular unit 31, 131a, or 131b.

Still referring to FIG. 20, the tape player-radio 240 is of the conventional type tape player-radio which has been modified to utilize the functions of any one of module 31, module 131a, or module 131b. The tape player-radio 240 has the conventional features of an antenna 241, a display 242, speakers 243, and an internal power source (not shown). One of the modifications to the conventional type tape player-radio for the present invention is the addition of the slot 361 adapted to receive and electrically connect with one of the modules 31, 131a, or 131b. A keypad 362 has also been added to the conventional tape player-radio so that a user can control the telecommunications functions of any one of the modules 31, 131a, or 131b.

Still referring to FIG. 20, one of the modules 31, 131a, or 131b is received in the slot 361 in the tape player-radio 240. The audio signal of the tape player-radio 240 is supplied to the module 31, 131a, or 131b through the electrical connections of the slot 361. The antenna 241, the display 242, the speakers 243, the keypad 362 and the internal power source of the tape player-radio 240 are also connected to the module 31, 131a, or 131b through the electrical connections of the slot 361. The functions of the telecommunications module 31, 131a, or 131b can be operated by the keypad 362.

Referring still to FIG. 20, the module 31, 131a, or 131b transmits and receives the linking signal 341 to and from the headset 345. Voice communication of the telecommunications function is accomplished with the earphones 346 and 347, and the microphone 348 of the headset 345. The earphones 346 and 347, the microphone 348, and the keypad (not shown) of the headset 345 connect with the tape player-radio 240 through the headset receiver/transmitter 343, and through the module 31, 131a, or 131b.

Referring now to FIGS. 17, 18, 19, and 20, although the illustrated embodiments disclose the telecommunication features being located in a detachable module, such as the module 31, the module 131a, or the module 131b, in another construction, the telecommunications electronics are integrated into the consumer electronic audio system, e.g. the personal radio/tape players 210, 220, 230, and the portable tape player-AM/FM Radio 240, instead of being a part of the separate detachable module. In yet another construction, the telecommunications electronics are within a second module that connects to the modular unit 31, 131a, or 131b through the host electronic system. In yet another construction, the telecommunications electronics are within a second module that connects directly to the modular unit 31, 131a, or 131b. Although the module ports of the host electronic systems have been described as having walls and an open end, the module port can also be only a connector for receiving the module. It should also be noted that the module 31, the module 131a, and the module 131b can be any analog or digital technology.

Figure 21:
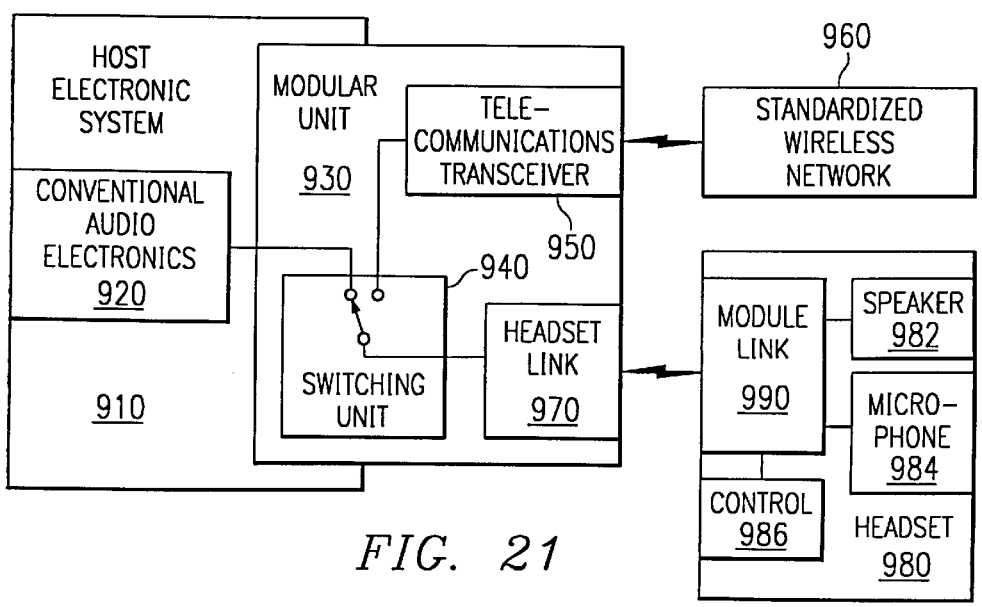
FIG. 21 is a block diagram, illustrating yet another embodiment of the present invention having a headset link, a telecommunications transceiver, a modem, and a switching component.

Referring now to FIG. 21, there is shown a block diagram of the embodiment of the present invention illustrated in FIGS. 17, 18, and 19. A host electronic system 910 contains conventional electronic audio components 920, such as a radio receiver, a recording medium player, or the like. The conventional electronic audio components 920 electrically connect to a modular electronic component 930. A switching unit 940 in the modular unit 930 is connected to the conventional electronic audio components 920 of the host electronic system 910. A telecommunications transceiver 950 in the modular unit 930 is also connected to the switching means 940. The telecommunications transceiver 950 is adapted for communicating with at least one of a plurality of standardized wireless networks 960 in accordance with at least one pre-selected communication standard.

Still referring to FIG. 21, the switching means 940 is also connected to a headset link 970 in the modular unit 930. The headset link 970 in the modular unit 930 communicates with a module link 990 in a headset 980. The headset link 970 and the module link 990 can be infra-red, short range radio, or the like. In one embodiment, the headset link 970 and the module link 990 are replaced by a cable which provides a direct electrical connection between the switching means 940 and the headset 980. The headset includes earphones or a speaker 982, a microphone 984, and a keypad or control panel 986. The speaker 982, the microphone 984, and the control panel 986 are electrically connected to the module link 990. In this manner, the headset 980 communicates the various audio and control signals between the user and the headset link 970 in the modular unit 930.

Referring still to FIG. 21, the switching means 940 switches connection of the headset link 970 in the modular unit 930 between the conventional electronic audio components 920 and the telecommunications transceiver 950. In one embodiment, the switching means 940 is a conventional manual switch. In another embodiment, the switching means 940 is a device utilizing hands free technology phone answering. Examples of hands free technology phone answering are illustrated by U.S. Pat. No. 4,591,661 titled "Portable Cordless Telephone-Radio Receiver" and issued to Benedetto et al. May 27, 1986, and U.S. Pat. No. 4,993,061 titled "Portable Miniature High Fidelity Stereo Tape Player and Cordless Radio Telephone System" and issued to Hsieh on Feb. 12, 1991, both of which are hereby specifically incorporated by reference. Although hands-free technology phone answering may be known, the discovery of the combination of the hands-free technology phone answering with the other aspects of the present invention are considered to be part of the present invention.

Figure 22:
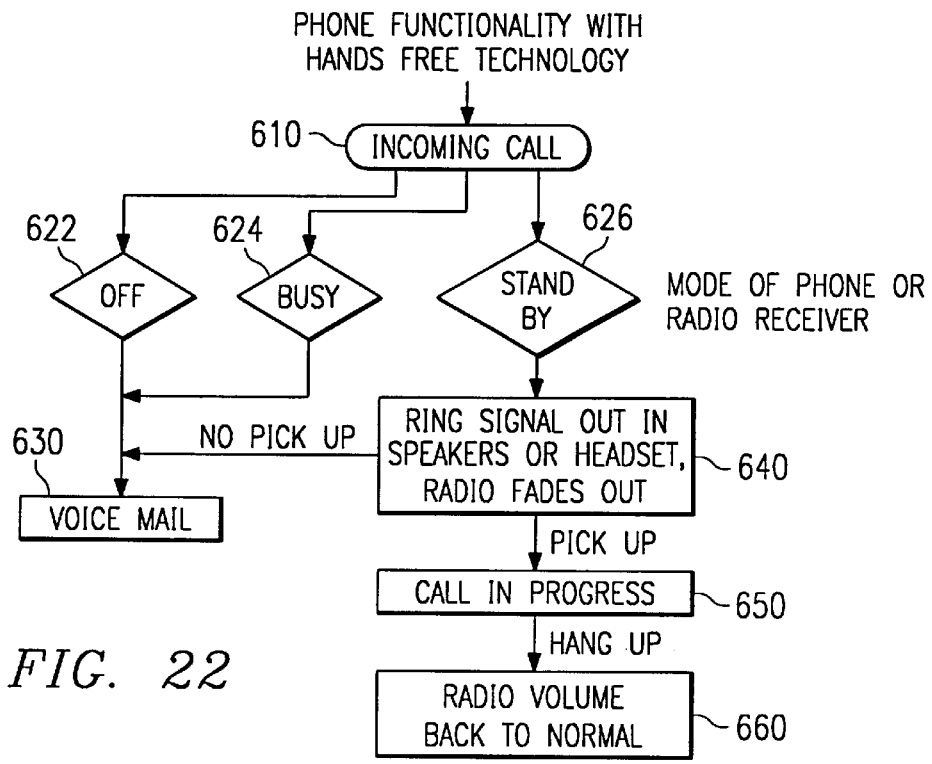
FIG. 22 is a block diagram illustrating phone functionality with hands free technology utilized in a phone transmission embodiment of the present invention.

Referring now to FIG. 22, there is shown a flow diagram illustrating one example of a process used by the present invention for hands free technology phone answering. The process begins by the receiving of an incoming call at step 610. The incoming call is routed from step 610 depending upon the mode of the phone or electronic audio equipment. If the phone or electronic audio equipment is in an off mode, the incoming call is routed at step 622 to voice mail at step 630. If the phone or electronic audio equipment is in a busy mode, i.e. operating on a call in progress, the incoming call is routed at step 624 to the voice mail at step 630. If the phone or electronic audio equipment is in a standby mode, the incoming call is routed at step 626 to a step 640. In step 640, the system sends a ring signal through the speakers or headset of the electronic audio equipment, and fades the volume of the electronic audio equipment out. If the incoming call is not answered in response to the ring signal in step 640, i.e. the user does not "pick up" the phone, the incoming call is routed at step 640 to the voice mail in step 630. If a user answers the incoming call in response to the ring signal in step 640, the incoming call is routed at step 640 to progress into a "call in progress" at step 650. Once the "call in progress" is completed in step 650, the user disconnects or "hangs up" the connection and the electronic audio equipment is returned to standby condition and its normal volume and audio play mode at step 660.

Figure 23:
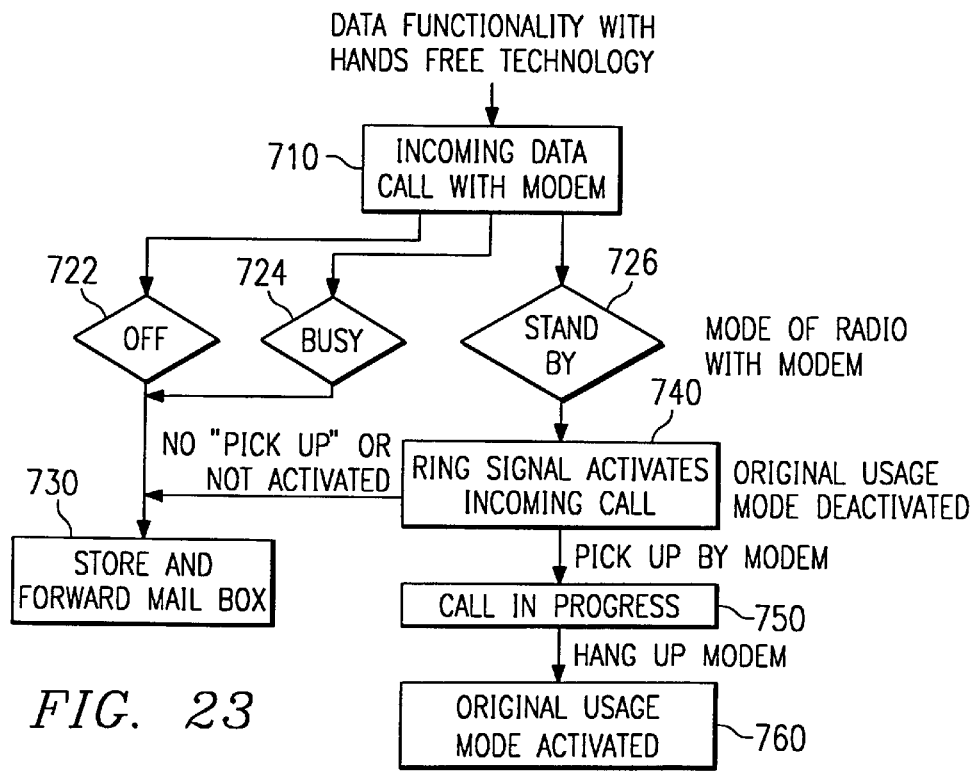
FIG. 23 is a block diagram illustrating data functionality with hands free technology utilized in a data transmission embodiment of the present invention.

Referring now to FIG. 23, there is shown a flow diagram illustrating one example of hands free technology used in the present invention for data type functionality. The process begins with an incoming data call received at step 710. The incoming data call is routed from step 710 depending on the mode of the electronic audio equipment with the modem. If the electronic equipment is in an off mode, the incoming call is routed at step 722 to a store and forward mailbox at step 730. If the electronic audio equipment is in a busy mode, i.e. operating on a current call in progress, the incoming call is routed at step 724 to the store and forward mailbox at step 730. If the electronic audio equipment is in a standby mode, the incoming data call is routed at step 726 to a step 740. In step 740, a ring signal is generated for indicating that an incoming data call exists. If the automatic connection or "pick up" of the modem is not activated, the incoming call is routed at step 740 to the store and forward mailbox at step 730. If the modem pick up is activated, the incoming data call is routed at step 740 to the call in progress mode at 750. After the call in progress has terminated, the modem disconnects or "hangs up" and the electronic audio equipment is returned to the original volume and function, and is placed into the standby mode at step 760.

Figure 24:
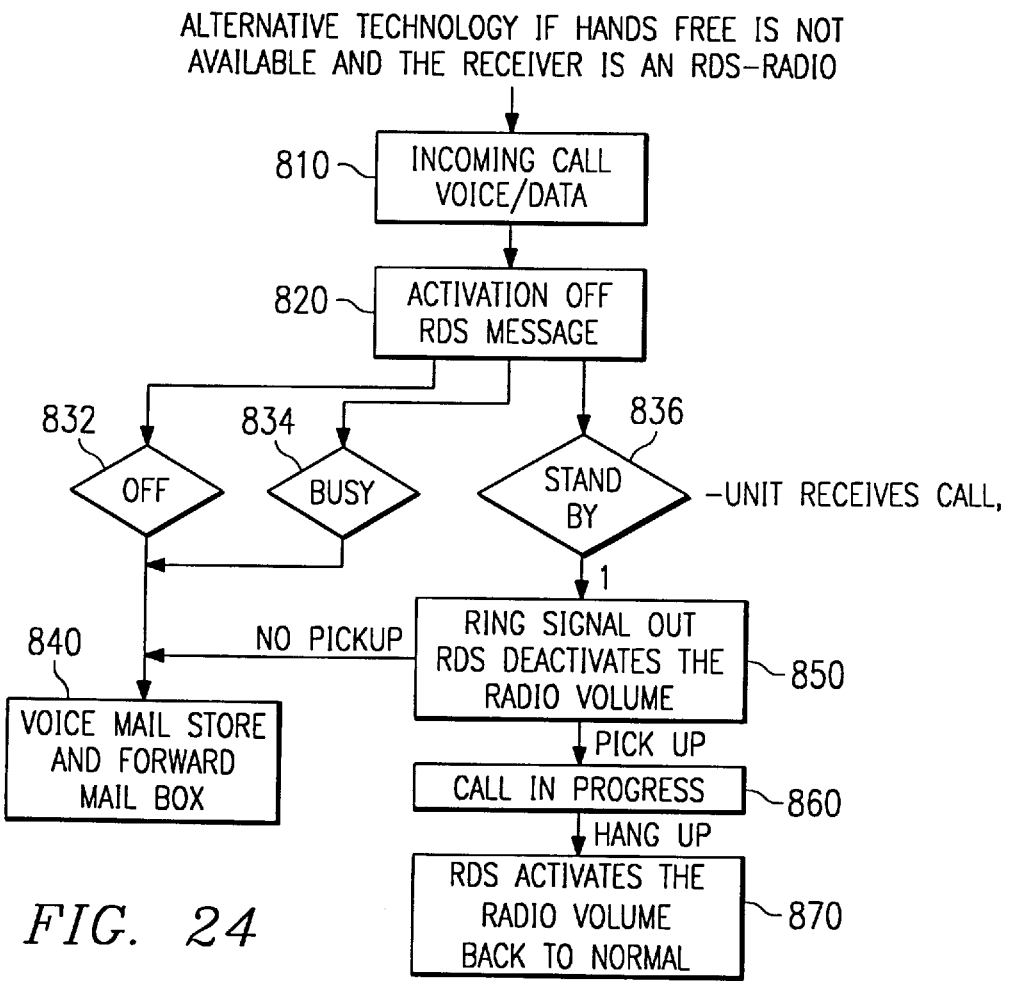
FIG. 24 is a block diagram illustrating telecommunications functionality with a Radio Data System (RDS) radio receiver.

Referring now to FIG. 24, there is shown a flow diagram illustrating the process of receiving an incoming call on a Radio Data System (RDS) electronic audio system. The process begins with an incoming voice or data call at the step of 810. Sensing of an incoming call activates the RDS message at step 820 and the telecommunications unit receives the call. The routing of the incoming call is determined by the mode of the telecommunications unit. If the telecommunications unit is in an off mode, the incoming call is routed at step 832 to voice mail storage and forwarding mail box at step 840. If the telecommunications unit is in a busy mode, i.e. operating with a call in progress, the incoming call is routed at step 834 to the voice mail storage and forwarding mail box at step 840. If the telecommunications unit is in a standby mode, the incoming call is routed at step 836 to step 850. In step 850, a ring signal is generated and the RDS electronic equipment deactivates the volume of the electronic audio system. If the incoming call is not picked up, the incoming call is routed at step 850 to the voice mail storage and forwarding mail box at step 840. If the incoming call is picked up, the incoming call is converted to a call in progress at step 860. Once the call in progress has terminated, the telecommunications unit is disconnected or "hanged up" and the RDS electronic equipment activates the volume back to a normal condition and sets the telecommunications unit to a standby mode in step 870.

As described above it may be seen that the modular units 31, 131*a*, and 131*b* have multiple uses. From a design perspective, they may be relatively thick, on the order of 10.5 mm and the particular electronic equipment will have to be appropriately modified in design for receipt thereof. The connector 33 or 133 of the modular unit 31, 131*a*, or 131*b* may include a standard PCMCIA 3.0 mm card interconnection. Moreover, as described above the card edge connector 33 or 133 may include special pin outs 149*a* and 149*b* for higher power connection and consumption in certain situations.

It may further be seen from the figures above that antenna connections, as well as special power connections, enable the implementation of a modular unit with a minimum of special adaptations required for individual installations in electronic systems or equipment. In this way, the system of the present invention enables the construction of modular radio communications units for flexible adaptation to different standards and different circumstances but which can be incorporated into standard card slots in a variety of electronic devices that are on the market today.

While it is believed that the operation and construction of the system of the present invention will be apparent from the foregoing description, the method of operation and structure of the system shown and described has been characterized as being preferred and obvious changes and modifications may be made therein without departing from the spirit and scope of the invention as defined in the following claims.

What is claimed is:

1. A system comprising:
   a host electronics system connected to a telephone network;
   a telecommunications component for establishing a telecommunications link with the telephone network;
   a modular unit for electrically connecting to said host electronic system and for electrically connecting to said telecommunications link;
   a headset;
   means for communicating between the telecommunications component of said modular unit and said headset; and
   wherein said host electronic system includes an electronic audio component, and wherein said modular unit includes a switch for selectively electrically connecting said means for communicating with said telecommunications component of said modular unit or said electronic audio component of said host electronics system.

2. The system as set forth in claim 1, wherein said switch comprises means for fading out audio signals from the electronic audio component of said host electronic system and transmitting a signal indicating that an incoming call is available, upon sensing an incoming call to the telecommunications component of said modular unit.

3. The system as set forth in claim 1, wherein said host electronic system is connected to the telephone network through a Local Area Network.

4. The system as set forth in claim 1, wherein said means for communicating comprises a first short range radio transceiver and a second short range radio transceiver for communications with said first short range radio transceiver, said first short range radio transceiver being located in said modular unit and said second short range radio transceiver being located in said headset.

5. The system as set forth in claim 1, wherein said means for communicating comprises a first infra-red transceiver and a second infra-red transceiver for communications with said first infra-red transceiver, said first infra-red transceiver being located in said modular unit and said second infra-red transceiver being located in said headset.

6. The system as set forth in claim 1, wherein said modular unit is of a PCMCIA standard.

7. A system comprising:
   a host electronic system having:
      a module port with a module connector;
      an electronic audio component being electrically connected to the module connector;
   a modular unit having:
      a housing with a first end;
      a system connector disposed on the first end of the housing for engagement with the module connector of said host electronic system;
      a telecommunications transceiver for communicating input signals and output signals with one of a plurality of standardized wireless networks in accordance with at least one preselected communication standard;
      a switch having a first input electrically connected to the telecommunications transceiver, a second input electrically connected to the electronic audio component of said host electronic system through the module connector and the system connector, and an output, wherein the output is selectively connectable to the first input or the second input;
   a headset having:
      a speaker;
      a microphone; and
      means for communicating between the output of the switch in said modular unit and the speaker and the microphone of said headset.

8. The system as set forth in claim 7, wherein said module port and said modular unit are of a PCMCIA standard.

9. The system as set forth in claim 7, wherein said headset further includes a keypad which provides control signals to the telecommunications transceiver of said modular unit through the means for communicating.

10. The system as set forth in claim 7, wherein said means for communicating includes a cable extending between said modular unit and said headset.

11. The system as set forth in claim 7, wherein said means for communicating includes a first infra-red transceiver in said modular unit and a second infra-red transceiver in said headset, wherein said first infra-red transceiver communicates with said second infra-red transceiver.

12. The system as set forth in claim 7, wherein said means for communicating includes a first short range radio transceiver in said modular unit and a second short range radio transceiver in said headset, wherein said first short range radio transceiver communicates with said second short range radio transceiver.

13. The system as set forth in claim 7, wherein said host electronic system includes a battery power supply, and wherein the telecommunications transceiver of said modular unit receives electrical power from said battery power supply through the system connector of said modular unit and the module connector of said host electronic system.

14. The system as set forth in claim 13, wherein said module port and said modular unit are a modified PCMCIA standard which includes power contacts for transmitting the electrical power from said battery power supply to said telecommunications transceiver.

15. The system as set forth in claim 7, further including an external power source for providing electrical power to the telecommunications transceiver of said modular unit through a power connector mounted on the housing of said modular unit.

16. The system as set forth in claim 7, wherein said host electronic system includes an antenna connected to the telecommunications transceiver through the module connector of said host electronic system and the system connector of said modular unit, and wherein the telecommunications transceiver communicates with said standardized network through said antenna.

17. The system as set forth in claim 16, wherein said module port and said modular unit are of a modified PCMCIA standard which include at least one contact for coupling the antenna with the telecommunications transceiver.

18. The system as set forth in claim 7, further including an antenna for being coupled to the telecommunications transceiver of said modular unit through an antenna connector mounted on the housing of said modular unit.

19. The system as set forth in claim 7, wherein said switch further comprises means for fading out audio signals from said electronic audio component to said speaker and emitting a signal indicating that an incoming call is available, upon sensing an incoming call to said telecommunications transceiver.

20. The system as set forth in claim 7, wherein said host electronic system further comprises a display for displaying the functional information of said electronic audio component, wherein the telecommunications transceiver of said modular unit provides data signals to said display through the system connector of said modular unit and the module connector of said host electronic system, and wherein said display displays the functional information of the telecommunications transceiver.

21. The system as set forth in claim 7, wherein said host electronic system includes a keypad for providing control signals to the electronic audio component, and wherein said keypad provides control signals to the telecommunications transceiver of said modular unit through the module connector of said host electronic system and the system connector of said modular unit.

* * * * *